US011898398B2

(12) United States Patent
Zhang

(10) Patent No.: US 11,898,398 B2
(45) Date of Patent: Feb. 13, 2024

(54) FLAT-TYPE VENTILATION DOOR-WINDOW STRUCTURE

(71) Applicant: Taroko Door & Window Technologies, Inc., Gaoxiong (TW)

(72) Inventor: Deyou Zhang, Gaoxiong (TW)

(73) Assignee: TAROKO DOOR & WINDOW TECHNOLOGIES, INC., Gaoxiong (CN)

( * ) Notice: Subject to any disclaimer, the term of this patent is extended or adjusted under 35 U.S.C. 154(b) by 0 days.

(21) Appl. No.: 17/924,097

(22) PCT Filed: Mar. 18, 2021

(86) PCT No.: PCT/CN2021/081511
§ 371 (c)(1),
(2) Date: Nov. 8, 2022

(87) PCT Pub. No.: WO2021/232917
PCT Pub. Date: Nov. 25, 2021

(65) Prior Publication Data

US 2023/0175313 A1 Jun. 8, 2023

(30) Foreign Application Priority Data

May 19, 2020 (CN) ......................... 202010424312.0
Mar. 18, 2021 (WO) ................ PCT/CN2021/081511

(51) Int. Cl.
*E06B 3/50* (2006.01)
*E06B 3/44* (2006.01)

(52) U.S. Cl.
CPC .......... *E06B 3/5063* (2013.01); *E06B 3/4415* (2013.01)

(58) Field of Classification Search
CPC ............... E05F 2017/005; E05D 15/22; E05D 2015/485; E05D 15/20; E06B 3/5063; E06B 3/44
See application file for complete search history.

(56) References Cited

U.S. PATENT DOCUMENTS 1,533,048 A * 4/1925 Sustarsic ............... E06B 3/5018 49/129
6,840,009 B2 * 1/2005 Ronay ..................... E05D 15/20 49/128

(Continued)

FOREIGN PATENT DOCUMENTS

CN 102486072 A * 6/2012

OTHER PUBLICATIONS

CN102486072A Translation from WIPO (Year: 2012).*

*Primary Examiner* — Daniel J Troy
*Assistant Examiner* — Susan M. Heschel
(74) *Attorney, Agent, or Firm* — Che-Yang Chen; Law Office of Michael Chen

(57) ABSTRACT

A flat-type ventilation door-window structure includes a frame (1), a first movable sash (2) and a second movable sash (3). The first movable sash (2) and/or the second movable sash (3) can slide up and down in an opening (11) of the frame (1). A first guide device (300) and a second guide device (400) being respectively provided between the first movable sash (2) or the second movable sash (3) and the frame (1). The first guide device (300) and the second guide device (400) can guide the first movable sash (2) or the second movable sash (3) to change the sliding path. The flat-type ventilation door-window structure can block outdoor sound, rain and air, and improve sound insulation, water tightness and air tightness.

9 Claims, 12 Drawing Sheets

(56) References Cited

U.S. PATENT DOCUMENTS

| | | | | |
|---|---|---|---|---|
| 8,191,313 | B2 * | 6/2012 | Ito | E06B 3/5063 49/458 |
| 8,220,846 | B2 * | 7/2012 | Liang | E05C 1/10 292/DIG. 41 |
| 8,245,445 | B2 * | 8/2012 | Palacios | E05D 15/20 49/128 |
| 8,978,303 | B1 * | 3/2015 | Rogers | E05D 15/22 49/185 |
| 10,443,283 | B2 * | 10/2019 | Seiling | E06B 3/5063 |
| 11,193,318 | B2 * | 12/2021 | Kellum | E05D 13/04 |
| 2013/0118084 | A1 * | 5/2013 | Owen | E05D 15/44 49/181 |

* cited by examiner

FLAT-TYPE VENTILATION DOOR-WINDOW STRUCTURE

FIELD OF INVENTION

The present invention relates to a door-window, in particular a flat-type ventilation door-window structure with ventilation and improved sound and water tightness.

DESCRIPTION OF RELATED ARTS

Current ventilation windows described in Taiwan Patent Publication No. 498924, M274437 and M250028 have the expected efficacy of increasing convection of air and quick installation and ease of removing and cleaning of the screen, while all the structures disclosed in these prior patents have two movable sashes that can move up and down. The two movable sashes are in front and rear overlapping states, either in the open or closed state, so that the ventilation door-windows often suffer from poor sound and water tightness when the two movable sashes are closed.

SUMMARY OF THE PRESENT INVENTION

The technical solution of present invention is as follows. A flat-type ventilation door-window structure includes a frame, a first movable sash and a second movable sash. The first movable sash and/or the second movable sash can slide up and down in an opening of the frame. A first guide device and a second guide device are respectively provided between the first movable sash or the second movable sash and the frame. The first guide device and the second guide device can guide the first movable sash or the second movable sash to change the sliding path.

The advantage of the present invention is as follows. The main object of the present invention is providing a flat-type ventilation door-window structure, which can prevent the sound, rain and air from entering into room through the gaps between the first or second movable sash and the frame by overlapping up and down the first and second sashes.

DETAILED DESCRIPTION OF THE PREFERRED EMBODIMENT

Figure 1:
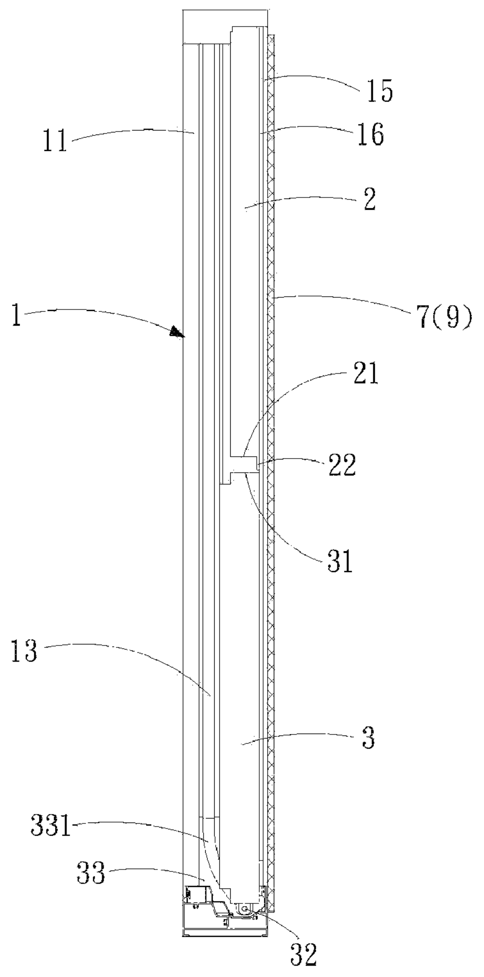
FIG. 1 is a schematic view of the first movable sash and the second movable sash housed in the frame of the present invention.
Figure 2:
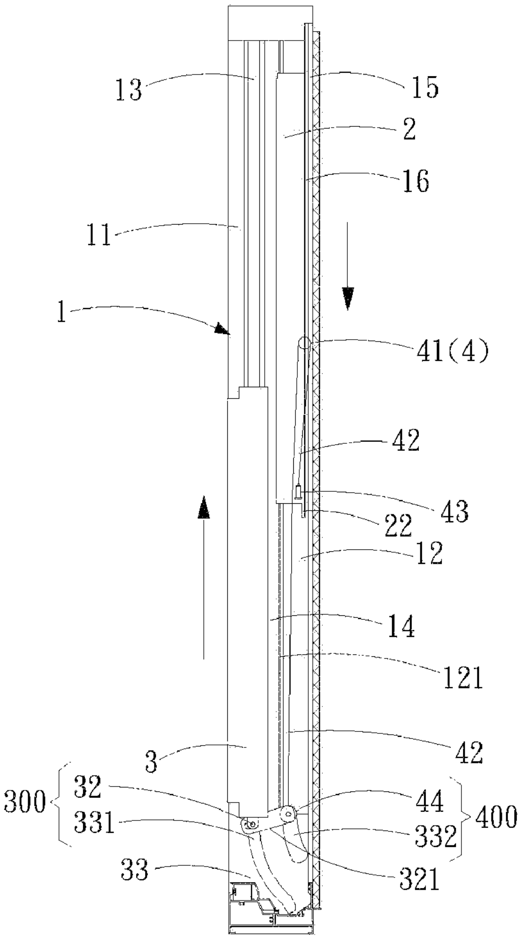
FIG. 2 is a schematic view of the moving of the first movable sash and the second movable sash according to the present invention.

As shown in FIGS. 1 and 2, in a preferred embodiment of the present invention, the flat-type ventilation door-window structure includes a frame 1, a first movable sash 2, a second movable sash 3 and at least one linkage device 4. Wherein the frame 1 comprises an opening 11 in which the first movable sash 2 and the second movable sash 3 are housed. The bottom surface 21 of the first movable sash 2 and the top surface 31 of the second movable sash 3 are opposite to each other and are planar (as shown in FIG. 1). The Linkage device 4 is provided between the frame 1, the first movable sash 2 and the second movable sash 3, so that when one sash moves up and down, the other sash is made to move up and down in opposite direction in the opening 11 of the frame 1, as shown in FIG. 2; The frame 1 is provided with a first sliding groove 12, a second sliding groove 13 and a third chute (14) arranged between the first sliding groove 12 and the second groove 13 on at least one side, wherein the first movable sash 2 and the second movable sash 3 slides in the first sliding groove 12 and the second sliding groove 13 respectively.

Figure 3:
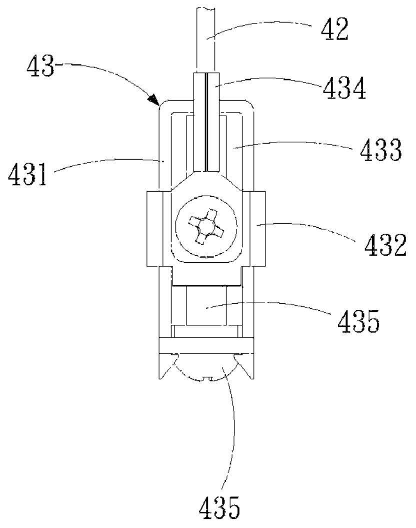
FIG. 3 is a schematic view of cord tightness regulator of the present invention.

As shown in FIGS. 1 to 3, the linkage device 4 has at least a wheel 41 and a cord 42. The wheel 41 is arranged in the first sliding groove 12 of the frame 1. The two ends of the cord 42 pass around the wheel 41 and are arranged on the sides of the first movable sash 2 and the second movable sash 3 respectively opposite to the inner edge of the frame 1. In this embodiment, a cord tightness regulator 43 is provided at where the cord 42 is connected with the first movable sash 2 and includes at least a body 431 having a recessed slot 433 and an adjusting seat 432 housed in the recessed slot 433, and the adjusting seat 432 is provided with a cord fixing element 434 on which said cord 42 is fixed, and with a regulating screw 435 which passes through the said body 431, so that the user can adjust the tightness of the cord 42 directly from outside of the body 431.

As shown in FIGS. 1 to 3, the second movable sash 3 is provided with a first guide device 300 and a second guide device 400 near the inner edge of the frame 1. The first guide device 300 has at least a first guide protrusion 32 and a first guide groove 331. The second guide device 400 comprises a second guide protrusion 44 and a second guide groove 332. A pivoting tab 321 is provided between the first protrusion 32 and the second guide protrusion. The other end of the cord 42 is fixed on the second guide protrusion 44. At least one guide block 33 is provided at a side of the frame 1 opposite to the first guide protrusion 32 of the second movable sash 3. The guide block 33 is provided with the first guide groove 331 and the second guide groove 332, wherein the tops of the slots of the first guide groove 331 and the second guide groove 332 are respectively communicated with the second sliding groove 13 and the first sliding groove 12. The first guide groove 331 and the second guide groove 332 are slots formed by curving of the top of the block 33 towards the inside of the opening 11. The first guide protrusion 32 of the second movable sash 3 slides in the first guiding groove 331 of the guide block 33, so that when slide upward, the second movable sash 3 can obliquely moves up along the first guiding groove 331 without contacting the first movable sash 2, and when slide downward, the sliding speed of the second movable sash 3 can be slowed down, due to the arcing action of the second guiding groove 332. The second guide protrusion 44 of the second movable sash 3 slides in the second guiding groove 332 of the guide block 33, the speed of sliding down of the second movable sash 3 can also be slowed down by the arcing action of the second guiding groove 332.

Figure 4:
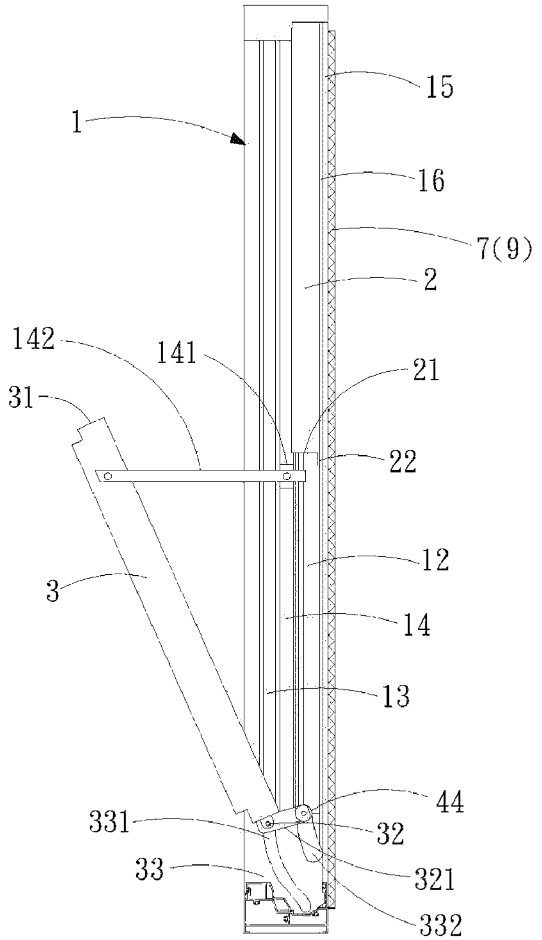
FIG. 4 is a schematic view of the top of the second movable fan being dialed outwardly according to the present invention.

As shown in FIG. 2, the first sliding groove 12 of the frame 1 is provided with a slot 121 recessed inwardly at a side wall which slides up and down with respect to the second guide protrusion 44. As shown by dashed lines in FIG. 2, a partial wheel of the second guide protrusion 44 is limited in the first sliding groove 12 by the slot 121, so that the stability of the sliding movement of the second movable sash 3 in the second sliding groove 13 is increased, and without risk of shifting or sliding out of the second sliding groove 13. As shown in FIG. 4, the third sliding groove 14 is provided with a sliding block 141 including a connecting rod 142, and one end of the connecting rod 142 is connected to the second movable sash 3. By means of the structure said above, the top of the second movable sash 3 can be dialed to a greater inclined angle without risk of falling.

Figure 5:
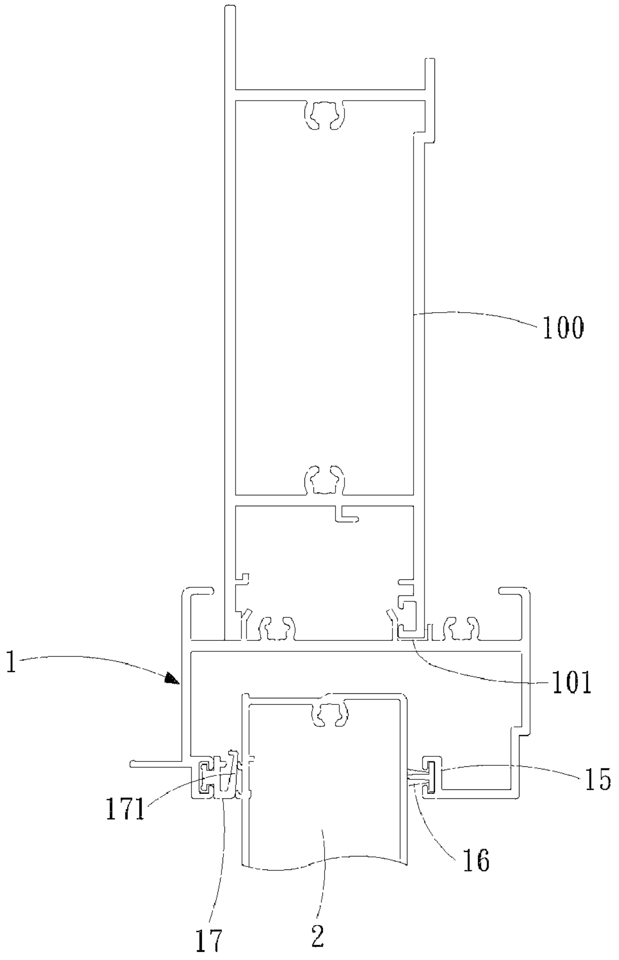
FIG. 5 is a schematic view of the first movable sash in contact with the first pushing member according to the present invention.
Figure 6:
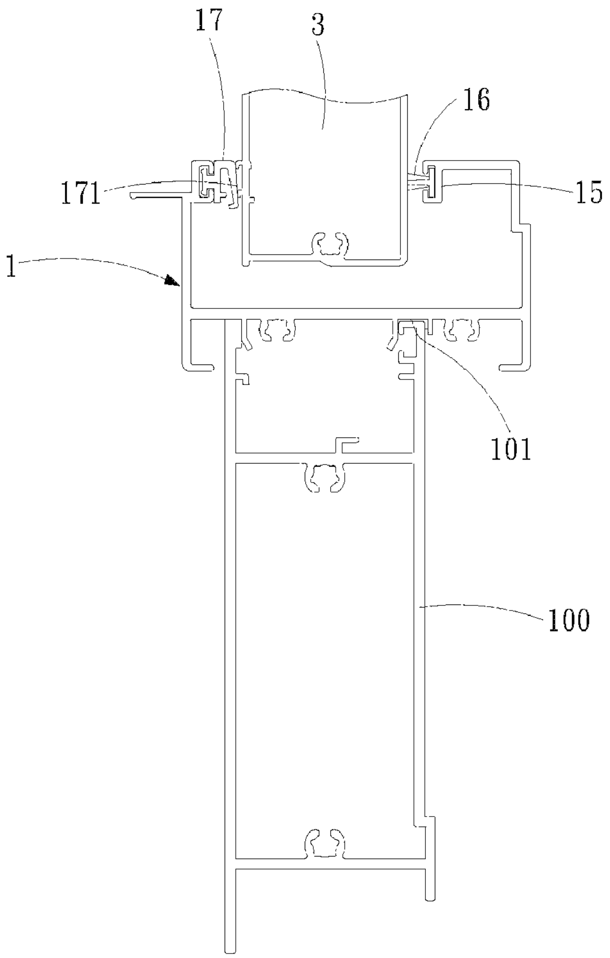
FIG. 6 is a schematic view of the second movable sash in contact with the first pushing member according to the present invention.

As shown in FIGS. 5 and 6, the inner edge of the frame 1 is provided with a first extension 15 at one side relative to the first movable sash 2 and the second movable sash 3 and a first seal member 16 is provided on the first extension 15. A plurality of first pushing members 17 are provided on the inner edge of the frame 1 at a distance from the first seal member 16. The first pushing member 17 is provided with a slope 171, when the first movable sash 2 and/or the second movable sash 3 are reached to the first pushing member 17, the two sashes can be pushed towards the first seal member 16 along the slope 171, so that the first movable sash 2 and/or the second movable sash 3 can be fitted tightly with the first seal member 16, thus, an excellent sound insulation, water tightness and air tightness can be got between the first movable sash 2, the second movable sash 3 and the frame 1. As shown in FIGS. 5 and 6, when the frame 1 is implemented on the door, the frame 1 further comprises an outer rim 100, and at least a third sealing strip 101 is provided between the frame 1 and the outer rim 100, so that the present embodiment may not have problems of reducing the water tightness, air tightness and sound insulation.

Figure 7:
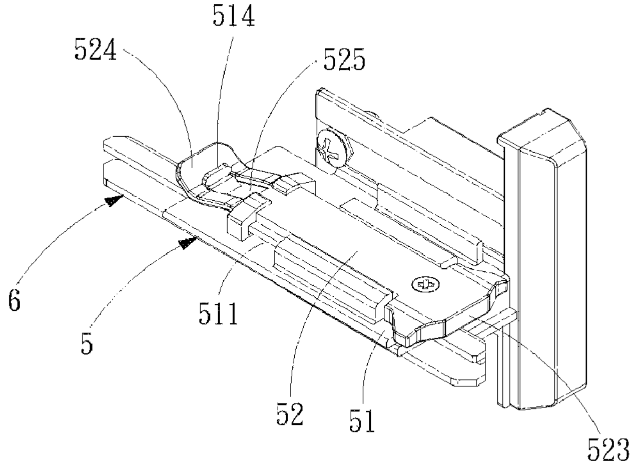
FIG. 7 is a perspective view of the positioning device and the forcing means of the present invention.
Figure 8:
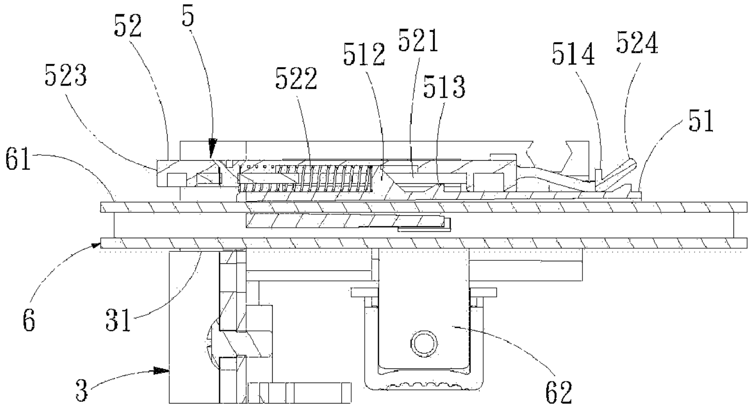
FIG. 8 is a cross-sectional view of the positioning device and the forcing means of the present invention.
Figure 9:
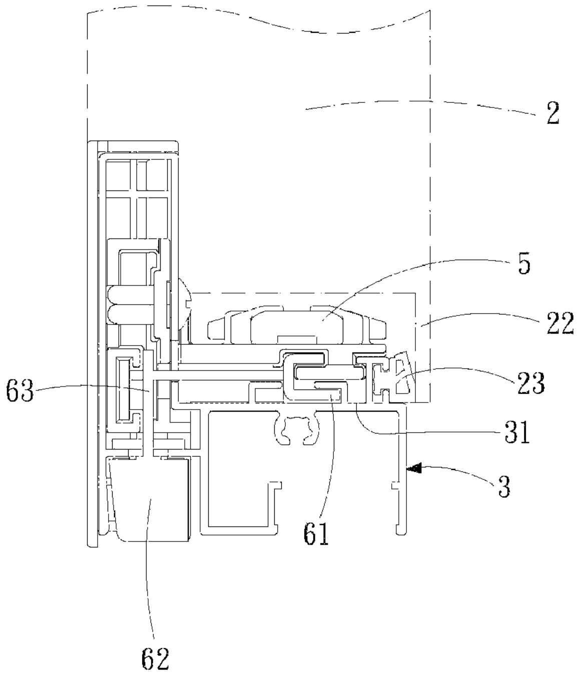
FIG. 9 is a schematic view of the positioning device and the forcing means of the present invention assembled on the top of the second movable sash according to the present invention.

As shown in FIGS. 7 and 8, at least one positioning device 5 is provided on the top surface 31 of the second movable sash 3, and the positioning device 5 including at least a base 51 and a positioning member 52. The base 51 is provided on the top surface 31 of the second movable sash 3 near the second sliding groove 13 of the frame 1, and is provided with a slide rail 511 on the top surface. The positioning member 52 is placed in the slide rail 511 and can slide in it. The positioning member 52 is provided with a receiving groove 521, and a first stopping portion 512 and a second stopping portion 513 protrude from the seat 51 at a position opposite to the receiving groove 521. An elastic member 522 is provided between the first stopping portion 512 and the wall of the receiving groove 521. An abutment is formed by the second stopping portion 513 and the receiving groove 521. One end of positioning member 52 near the side of the frame 1 forms a positioning portion 523, and the other end is a fixing rod 524 arranged with a snap hole 525, and the base 51 is arranged with a snap protrusion 514 opposite to the snap hole 525. By the structure said above, when the top of the second movable sash 3 is inclined to a small opening, the fixing rod 524 can be toggled upwards, so that the snap protrusion 514 can depart from the snap hole 525, and make the positioning portion 523 abut against the second sliding groove 13 of the frame 1 by the elastic force of the elastic member 522, and just form and abutment between the positioning portion 523 and the second sliding groove 13 of the frame 1.

Figure 10:
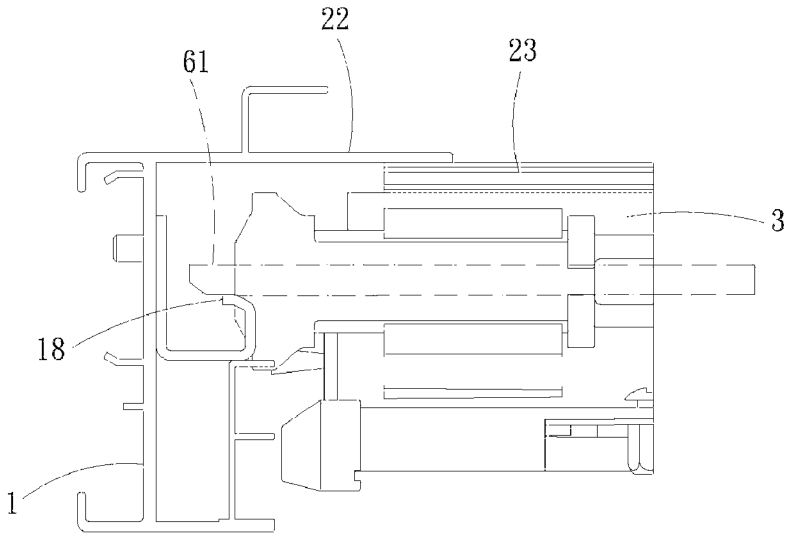
FIG. 10 is a schematic view of the forcing means in contact with the second pushing member according to the present invention.
Figure 11:
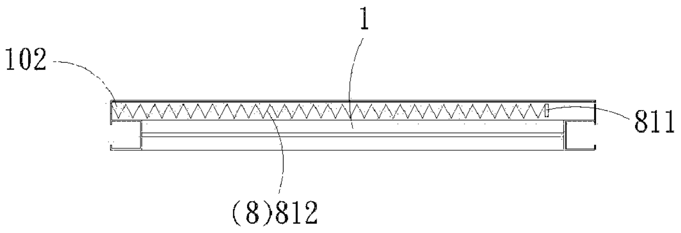
FIG. 11 is one schematic view of the folding screen of the present invention.
Figure 12:
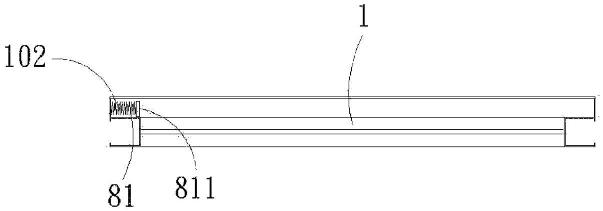
FIG. 12 is another schematic view of the folding screen of the present invention.
Figure 13:
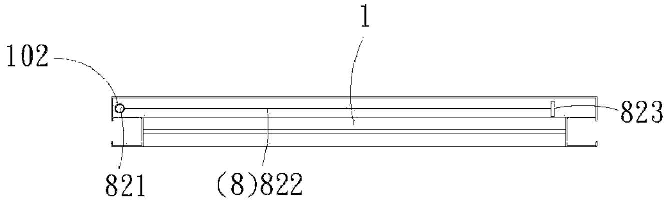
FIG. 13 is one schematic view of the rolling bar screen of the present invention.
Figure 14:
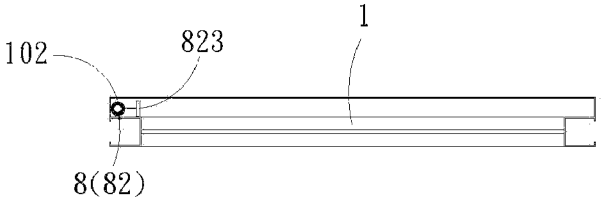
FIG. 14 is another schematic view of the rolling bar screen of the present invention.

As shown in FIGS. 1, 2, 7 to 10, wherein the first movable sash 2 is provided with a second extension 22 on the side facing the second movable sash 3, and a second seal member 23 is provided between the second extension 22 and the second movable sash 3. At least one forcing means 6 is further provided on the top surface 31 of the second movable sash 3. The forcing device 6 has at least a lever 61, a lead 62 and a connecting lever 63 connected between the lever 61 and the lead 62. In this embodiment, the lead 62 is arranged inside the top surface 31 of the second movable sash 3 and the connecting lever 63 is in a shape of L. Thus, with the structure said above, when the lead 62 is toggled inside the top surface 31 of the second movable sash 3, the lever 61 can extend and retract on the top surface 31 of the second movable sash 3. Furthermore, a second resilient pushing member 18 is provided at the inner edge of the frame 1 near one end of the lever 61. As shown in FIG. 10, when one end of the lever 61 touch and against the second pushing member 18, the second pushing member 18 can move the lever 61, and make the second movable sash 3 move toward the second extension 22 of the first movable sash 2, as indicated by the imaginary line in FIG. 10, thus, allows the second seal member 23 to more closely conform to the second movable sash 3 and the second extension 22 of the first movable sash 2, thereby increase the water tightness and air tightness between the first movable sash 2 and the second movable sash 3. In this embodiment, the first seal member 16 and the second seal member 23 are rubber strips, but not limited to the foregoing, all structures having sound insulation, air tightness and air tightness are falling within the scope of this application.

As shown in FIGS. 1 and 2, the frame 1 is provided with a screen 7 and/or an antiriot net 9 at one side, so that the present embodiment can prevent the external mosquitoes from entering into the room and/or prevent anyone from intrusion. As shown in FIG. 11-14, the screen 7 and/or the antiriot net 9 may be a hidden screen 8, such as a folding screen 81 or a rolling bar screen 82, so that the user can pull down the hidden screen 8 to prevent light and mosquitoes from entering into room. The folding screen 81 has at least a movable frame 811 and a screen 812, and both sides of the screen 812 are mounted on the movable frame 811 and the side of the frame 1 respectively, or one end of the screen 812 is provided with a fixing member (not shown) to facilitate the mounting of the end on the side of the frame 1. The rolling bar screen 82 has at least a rolling bar 821, a screen 822 and a movable frame 823, wherein the rolling bar 821 is provided on the side of the frame 1, and the ends of the screen 822 are provided on the rolling bar 821 and movable frame 823 respectively. The screen 822 can extend or retract by pulling the movable frame 823. Furthermore, the frame 1 is provided with a recessed slot 102 at the position where the hidden screen 8 is housed, and the folding screen 81 and rolling bar screen 82 can be completely hidden in the recessed slot 102.

The said above is only preferred embodiments of the present invention and is not intended to limit the scope of the present invention. All equivalent technical variations according to the present description and the Fig. are intended to be included in the scope of the present invention.

What is claimed is:

1. A flat-type ventilation door-window structure, characterized in that, comprising a frame, a first movable sash and a second movable sash, wherein the first movable sash and the second movable sash can slide up and down in an opening of the frame, a first guide device and a second guide device are respectively provided between the first movable sash or the second movable sash and the frame, the first and the second guide device can guide the first or the second movable sash to change the sliding path, wherein the first guide device has at least a first guide protrusion and a first guide groove, and the second guide device comprises a second guide protrusion and a second guide groove, wherein the first and the second guide protrusion are provided in the second movable sash so that the first guide protrusion and the second guide protrusion can enter into the first guide groove and the second guide groove respectively, when the second movablesash slide down.

2. The flat-type ventilation door-window structure according to claim 1, characterized in that the first guide groove and second guide groove are downward grooves.

3. The flat-type ventilation door-window structure according to claim 1, characterized in that the frame is provided with a first sliding groove and a second sliding groove on at least one side, the first and the second movable sashes slide in the first and second sliding grooves respectively.

4. The flat-type ventilation door-window structure according to claim 3, characterized in that the first sliding groove of the frame is provided with a slot on the side wall facing the second guide protrusion.

5. The flat-type ventilation door-window structure according to claim 1, characterized in that further comprising a linkage device having at least a wheel and a cord mounted on said wheel, the two ends of the cord are provided respectively on the first and second movable sashes.

6. The flat-type ventilation door-window structure according to claim 5, characterized in that a cord tightness regulator is provided at where the cord is connected with the first movable sash.

7. The flat-type ventilation door-window structure according to claim 3, characterized in that a third sliding groove is provided between the first and second sliding grooves, and the third sliding groove is provided with a sliding block including a connecting rod, and one end of the connecting rod is connected to the second movable sash.

8. The flat-type ventilation door-window structure according to claim 1, characterized in that the inner edge of the frame is provided with a first extension at one side relative to the first and second movable sashes, a first seal member is provided on the first extension, and a plurality of first pushing members are provided on the inner edge of the frame at a distance from the first seal.

9. A flat-type ventilation door-window structure, characterized in that, comprising a frame, a first movable sash and a second movable sash, wherein the first movable sash and the second movable sash can slide up and down in an opening of the frame, a first guide device and a second guide device are respectively provided between the first movable sash or the second movable sash and the frame, the first and the second guide device can guide the first or the second movable sash to change the sliding path, at least one forcing means is further provided on the second movable sash, the forcing device has at least a lever, a lead and a connecting lever connected between the lever and the lead, wherein the lead is arranged inside the top surface of the second movable sash and a second resilient pushing member is provided at an inner edge of the frame near an end of the lever.

* * * * *